United States Patent [19]
Pelletier

[11] 3,867,792
[45] Feb. 25, 1975

[54] APPARATUS FOR BUFFING WORN TIRES

[75] Inventor: Guy Pelletier, Ville D'Anjou, Quebec, Canada

[73] Assignee: Rockland Industries Ltd., Quebec, Canada

[22] Filed: Apr. 16, 1973

[21] Appl. No.: 351,548

[30] Foreign Application Priority Data
May 8, 1972 Canada.................................. 141613

[52] U.S. Cl................................. 51/33 W, 157/13
[51] Int. Cl............................................. B29h 21/01
[58] Field of Search......... 51/33 R, 33 W, 51, 97 R, 51/45; 157/13

[56] References Cited
UNITED STATES PATENTS

| | | | |
|---|---|---|---|
| 1,845,172 | 2/1932 | Morey et al.......................... | 51/33 R |
| 2,766,563 | 10/1956 | Bennett............................... | 51/33 W |
| 2,893,479 | 7/1959 | Sheridan et al...................... | 157/13 |
| 3,162,233 | 12/1964 | Stull...................................... | 157/13 |
| 3,196,711 | 7/1965 | Spohn................................... | 74/625 |
| 3,502,131 | 3/1970 | Rawls................................... | 157/13 |
| 3,528,476 | 9/1970 | Hawkinson ........................... | 157/13 |

Primary Examiner—Al Lawrence Smith
Assistant Examiner—K. J. Ramsey
Attorney, Agent, or Firm—Fetherstonhaugh & Co.

[57] ABSTRACT

A buffing apparatus for grinding the tread portion of tires preparatorily to retreading. The apparatus comprises a buffer unit for mounting a buffer assembly and adjusting its position, and a tire supporting unit for holding a tire in place and rotating same during the grinding operation of its tread portion. The buffer assembly is mounted for moving back-and-forth in an arcuate path generally parallel to the axis of rotation of the tire, and the tire is mounted on a drivable spindle supported on a tower that is arranged so as to be adjustably displaced in a straight line essentially radially of the tire. The back-and-forth motion of the buffer assembly is effected by means of the combination of an electric motor coupled to a worm screw that carries a threaded block, the electric motor being capable of rotating the worm screw in either direction, and limit switches are used for reversing the sense of rotation of the motor and the worm screw. Similarly, the displacement of the tower is commanded by means of a reversible electric motor coupled to a worm screw onto which is mounted a threaded block, and the extreme positions of the tower are determined by the location of slidable limit switches.

3 Claims, 14 Drawing Figures

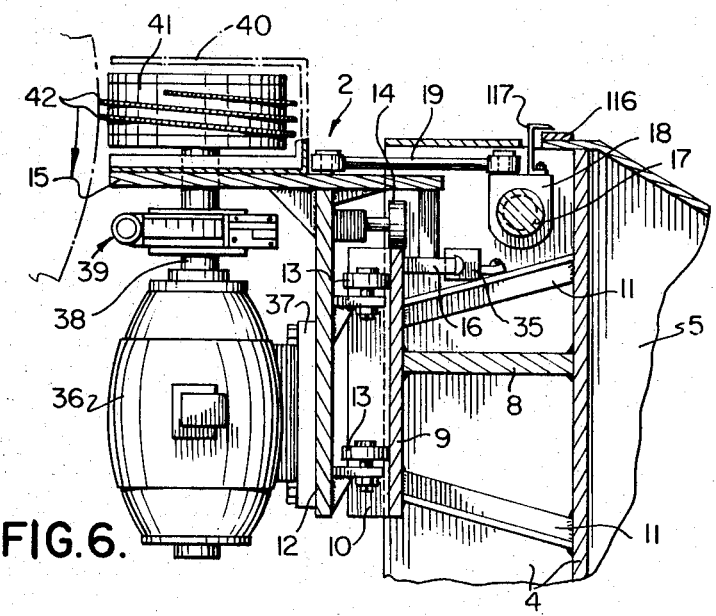
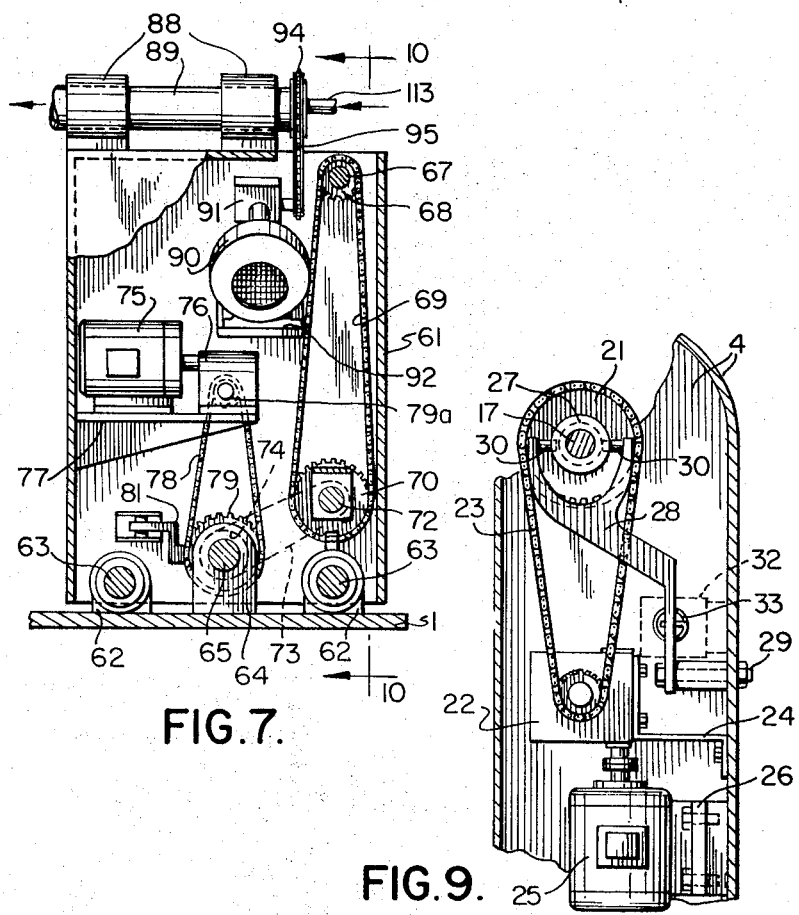

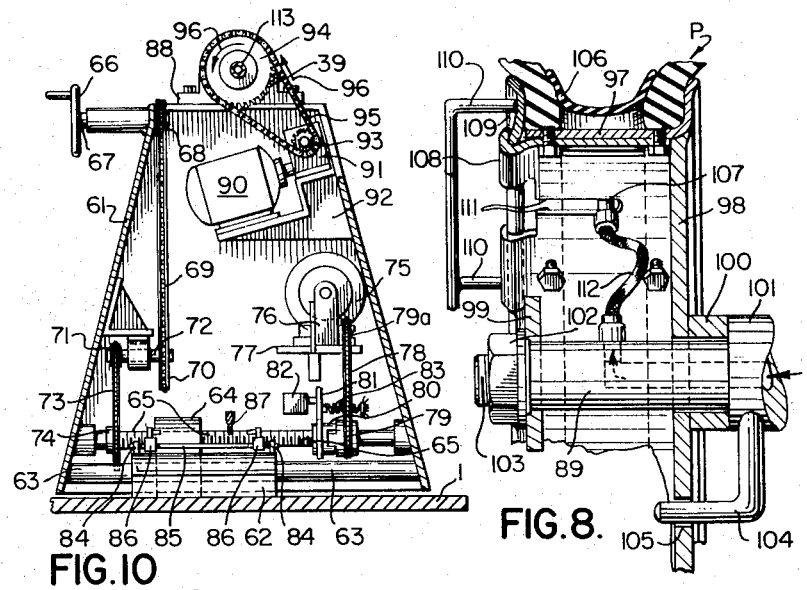
FIG.10
FIG.8.
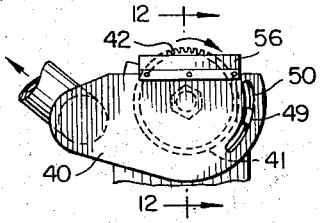
FIG.11
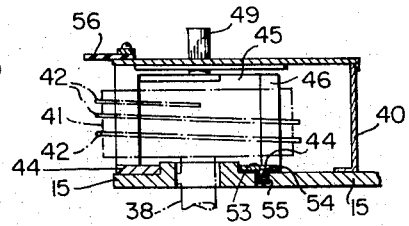
FIG.12.
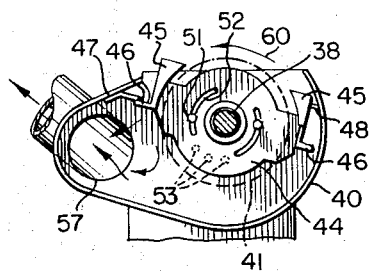
FIG.13.
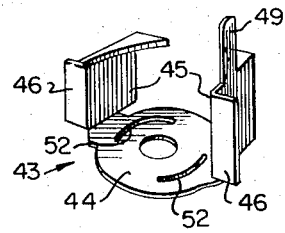
FIG.14.

APPARATUS FOR BUFFING WORN TIRES

This invention relates to an apparatus for buffing the tread portion of tires in preparation for retreading.

Before retreading a worn automotive tire, the tread portion of the tire must be carefully ground to the desired cylindrical shape by removing a certain thickness of rubber of the ground engaging surface of the tire.

The object of the invention is to provide an improved buffing apparatus which is simple to operate and which can be adapted to grind the tread portion of tires of different sizes and of various constructions including radial tires.

Another object of the invention is to provide a buffing apparatus which can complete the buffing operation within very short time in a semi or fully automatic manner and which insures adequate control over the depth of the grind and a high degree of roundness of the periphery of a buffed tire.

In accordance with this invention, a buffer assembly is secured to a carrier that is movable along a buffer guide means while the tire is supported by means of a mounting structure spaced an adjustable distance from the buffer guide means along a line extending essentially radially of the tire, and positioning means is provided which is used to vary the distance between the axis of rotation of the tire and the guide means onto which the buffer assembly is carried.

In accordance with the feature of this invention, the axis of rotation of the tire, when in position on the mounting structure of the buffing apparatus, extends essentially parallel to the path along which the buffer assembly is adapted to be displaced, and the axis of rotation of the grinding wheel of the buffer assembly is essentially perpendicular to the path.

In accordance with a further feature of this invention, the buffer assembly is caused to effect a back-and-forth motion along the path which is arcuate and concave in the direction facing the tire and its mounting structure.

Further features of this invention will become apparent from the following description of an exemplary embodiment of the invention given with reference to the accompanying drawings in which:

FIG. 6 is a cross-section taken along line 6—6 of FIG. 2;

FIG. 7 is a cross-section taken along line 7—7 of FIG. 2;

FIG. 8 is a cross-section taken along line 8—8 of FIG. 1 and showing a partial section of a rim for mounting a tire;

FIG. 9 is a cross-section taken along line 9—9 in FIG. 2;

FIG. 10 is a cross-section taken along line 10—10 in FIG. 7;

FIG. 11 is a plan view showing the top of the cover assembly casing;

FIG. 12 is a cross-section view along line 12—12 of FIG. 11;

FIG. 13 is a view showing the bottom surface of the cover assembly casing;

FIG. 14 is a perspective view of a movement element of the dust collecting casing.

Figure 1:
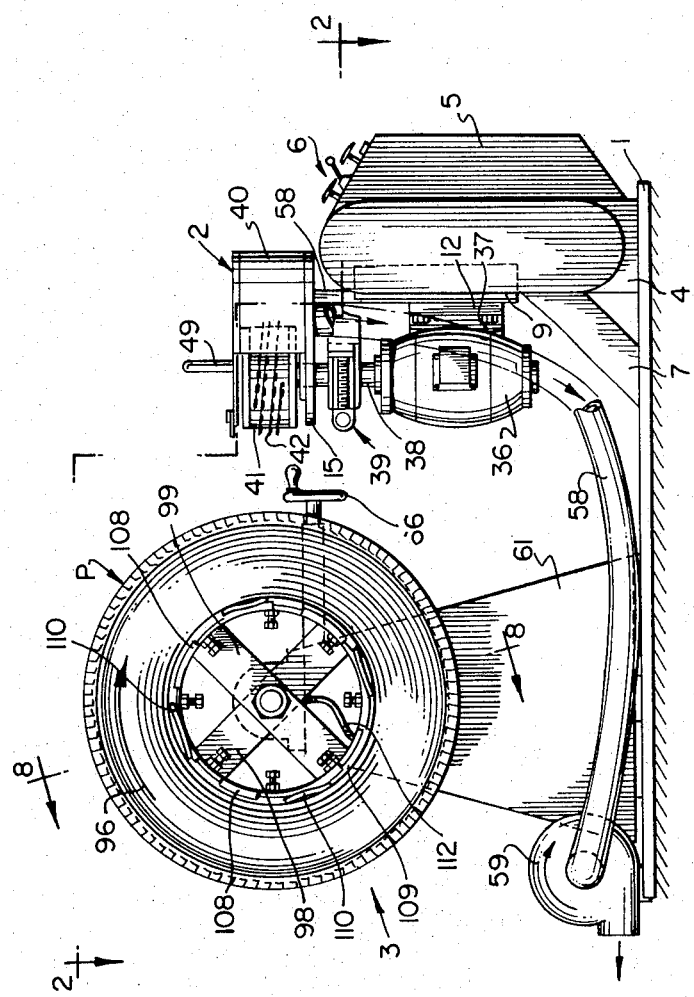
FIG. 1 is a side elevation view of a buffing apparatus.

The illustrated buffing apparatus comprises a base 1 which supports a buffing unit 2 and a tire mounting structure 3. Braces such as at 7 may of course be used for properly supporting buffer unit 2 onto base 1. Base 1 will not be absolutely essential since it is only necessary that units 2 and 3 be positively located a short distance one from the other.

Buffing unit 2 includes a frame 4 mounted to base 1 and a control panel 5 for mounting the necessary manual controls 6. The necessary electrical and electronic circuitry associated with controls 6 has not been shown since the invention is particularly concerned with the mechanical components of such a buffing apparatus.

Figure 2:
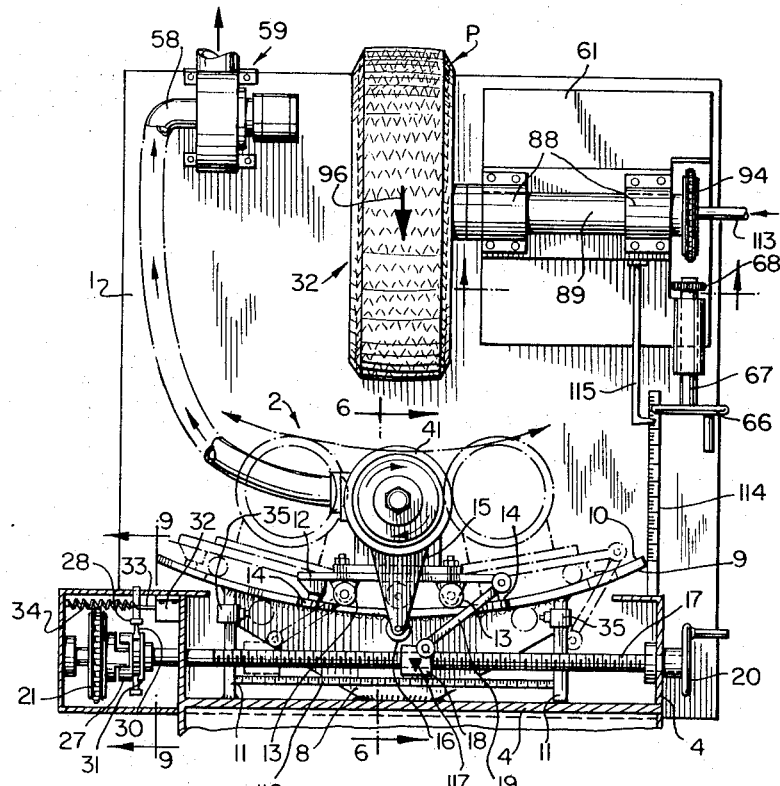
FIG. 2 is a top view taken along line 2—2 of FIG. 1.

With particular reference to FIGS. 1, 2 and 6, a buffer assembly is used which is mounted to a carrier which, in turn, is movable along a buffer guide means. Buffer guide means consists of a rigid arcuate plate 9 supported to frame 4 by means of a back plate 8. Carrier 12 is mounted for movement along plate 9 by means of rollers 13, 14 and 16, the latter being mounted to carrier 12 by means of plate 15. Arcuate plate 9 forms a concave surface 10 facing tire mounting unit 3 and rollers 13 are adapted to roll along this surface. Plate 9 provides an upper edge along which roller 14 is caused, by reason of the weight of the buffer unit, to ride and this maintains the buffer assembly in a predetermined horizontal plane.

Roller 16 rides against the back surface of plate 9.

As best shown in FIG. 2, a worm screw 17 is rotatably mounted to frame 4 behind arcuate plate 9 and generally parallel to the imaginary chord thereof. A threaded block 18 mounted in threaded engagement with worm screw 17 drives carrier 12 upon rotation of worm screw 17 due to the presence of rod 19 which is pivotally connected between block 18 and carrier 12. In FIG. 2, the phantom lines illustrate the extreme positions that can be assumed by carrier 12 and the buffer assembly that it carries. A hand operated crank 20 is fixed to one end of worm screw 17 for manual control of the position of the buffer assembly. A sprocket 21 is mounted to the other end of worm screw 17 and is connected to a speed reduction box 22 by means of chain 23 as best shown in FIG. 9. Speed reduction box 22 is supported to structure 4 by means of a shelf or bracket 24. A reversible motor 25, normally an electric motor, is mounted to bracket or support 26 and is coupled to speed reduction box 22 whereby to drive worm screw 17 into rotation.

Clutch means is provided between the motor and transmission mechanism and worm screw 17. It consists of an axially displacable element 27 supported to worm screw 17 and having axial projections which can engage into corresponding indentations on one face of sprocket element 21 as best illustrated in FIG. 2. A fork 28 pivoted at 29 to support 4 around an axis which is substantially transverse to the axis of rotation of worm screw 17 is adapted to ride in a circular groove 31 on the periphery of axially displacable element 27, and spaced apart and opposed projections 30 maintain fork 28 in contact with the groove such as to cause axial displacement of element 27 upon pivoting of fork 28. A solenoid 32 or similar electro-mechanical element having a plunger 33 connected to fork 28 is provided for causing pivoting of fork 28 and thereby cause disengagement of the drive system from worm screw 17. A return spring 34 counteracts the effect of solenoid 32 when the latter is not energized so as to maintain the clutch system in the fully engaged position. Disengagement of clutch system can be used to limit the displacement of threaded block 18 or alternatively can permit manual positioning of block 18 and therefore the associated buffer assembly by means of crank 20 seen in FIG. 2.

Limit switches 35 also shown in FIG. 2 are supported to arms 11 and so positioned as to be actuated by roller 16 whenever the carrier and buffer assembly reach one of the extreme positions shown in dotted lines in FIG. 2. Circuit means is provided so as to enable limit switches 35 to command reversal of the sense of rotation of motor 25 and the associated transmission means thereby to cause rotation of worm screw 17 in the different sense. The result is that the carrier is caused to travel back-and-forth along the arcuate plate 9.

A motor 36 also reversible is mounted to base 37 which in turn is supported to carrier 12 and is provided with an output shaft 38 that can be instantly stopped by means of a brake 39 operated by means of an electro-mechanical device, for example of solenoid (not shown). The solenoid is electrically coupled to the electric line delivering power to motor 36 such that upon shutting off of motor 36, output shaft 38 can be immediately stopped. Brake 39 is schematically illustrated as one using a circular band of known design but could be of any other suitable type.

Output shaft 38 projects through an aperture in plate 15 and a dust collecting housing 40 is mounted to plate 15 and it at least partially surrounds grinding wheel 41 mounted to the upper end of output shaft 38 for rotation therewith. The cylindrical surface of grinding wheel 41 is provided with an abrasive helical serrated edge 42 as particularly shown in FIGS. 1 and 6. Vane means 43 is mounted to the inside of the dust collecting cover 40 and includes a base portion 44 which is generally circular in shape and pivoted relative to the axis of rotation of shaft 38 immediately below grinding wheel 41 as is shown in FIGS. 12 and 13. Vane means 43 includes collecting vanes or blades 45 which extend axially relative to base 44 on either side of grinding wheel 41. Each blade 45 comprises a flange 46 adapted to bear against abutments 47 and 48 as shown in FIG. 13 depending on the angular position of vane means 43. Element 45 includes a projection 49 which projects through an arcuate slot 50 in the wall of dust collecting cover element 40, the shape of slot 50 being an arc of a circle centered upon the axis of rotation of grinding wheel 41. Screws 51 which extend through further arcuate slots 52 retain vane means 43 in position against plate 15 while allowing pivotal movement or displacement relative to plate 15. Cavities or sockets 53 formed on the inside surface of base 44 are disposed so as to be selectively engaged by a ball 54 urged by means of spring 55 disposed in a hole in plate 15. Protective blade 56 is secured to the upper section of cover 40 immediately above the upper region of grinding wheel 41. An opening 57 is provided through plate 15 behind grinding wheel 41 and is coupled by means of a flexible vacuum tube 58 to aspirator 59 on base 1.

Aspirator 59 is used to suck in the particles of rubber which are ground off the tread portion of the tire by means of grinding wheel 41. Vane element 43 can be pivoted about the axis of shaft 38 in either sense to allow one of blades 46 to abut one of abutments 47 and 48, depending on the direction of rotation of grinding wheel 41. It should be noted that in such an extreme position, ball 54 engages one of the extreme position sockets 53. For example, and with reference to FIG. 13, when grinding wheel 41 rotates in the direction shown by arrow 60 that is counter-clockwise, the corresponding position of vane element 43 is as shown in FIG. 13, and consequently ball 54 rests into the right-hand side socket 53. In this position, the left-hand side vane element 45 will come into play and collect the particles of rubber which grinding wheel 41 will have detached from the tread portion of the tire. Should the sense of rotation of grinding wheel 41 be reversed, the vane element 43 should be pivoted until ball 54 engages the left-hand side one of sockets 53 in which case the right-hand side vane element 45 would effect collecting of the rubber particles. The intermediate socket 53 is provided to permit a middle position to vane element 43.

Referring now to the tire mounting structure 3, a housing 61 which is sufficiently strong is provided for supporting tire P. Housing 61 is mounted to base 1 and is adapted to be displaced in a back-and-forth motion towards and away buffing assembly but essentially radially of tire P. With particular reference to FIGS. 7 and 10, base 1 supports a pair of apertured blocks 62 whose cylindrical openings extend parallel to one another towards the buffing assembly, and essentially transversally of arcuate guide plate 9. Rigid bars or rods 63 have their respective extremities secured to housing 61 and their intermediate portions extend through the cylindrical openings in blocks 62 thus supporting housing 61 onto base 1, but allowing the above referred to back-and-forth movement of housing 61.

A threaded block 64 is suitably secured to base 1 between blocks 62 with its threaded bore extending parallel to rigid bars or rods 63. A worm screw 65 is rotatably mounted to housing 61 and is threaded through block 64. A manual crank 66 is mounted to the outside of housing 61 and is connected to worm screw 65 by means of shaft 67, sprocket 68, chain 69, sprockets 70 and 71 on opposite ends of shaft 72, chain 73 and finally sprocket 74 which is fixedly mounted to the left-hand side region of worm screw 65 as seen in FIG. 10. This allows manual positioning of housing 61 relative to base 1. An electric motor 75 mounted to bracket or shelf 77 is adapted to drive worm screw 65 by means of a speed reduction box 76 also supported to bracket 77, chain 78 and sprockets 79 and 79a. A clutch device is provided which permits disconnection of worm screw 65 from drive motor 75. The clutch system includes an axially displacable element 80, a pivotable fork 81 engaging a circular groove in displacement element 80 and an electro-mechanical device 82, for example a solenoid, operatively associated to fork 81 to pivot same. Return spring 83 acting upon fork 81 urges axially displacable element 80 towards the fully engaged position. Hence, upon actuation of solenoid 82, the clutch system becomes fully disengaged and this enables the operator to manually control the position of housing 61 by means of hand crank 66.

Lugs 84 project upwardly at opposite ends of one of blocks 62. They support a rod 85 which extends subtantially parallel to bars 63. Limit switches 86 adjustably mounted to rod 85 are spaced apart from one another and are so disposed as to be actuated by means of an abutment 87 which is fixed to some element of housing 61. With this arrangement, when housing 61 has moved sufficiently far that its abutment 87 actuates one of limit switches 86, motor 75 is immediately stopped and so is the forward or rearward movement of housing 61. It will be seen that this control system enables one to adjust the depth of the grinding operation upon the tread portion of the tire which depth will of course vary depending on the size of tire P being worked on.

Pillow blocks 88 are secured to the top portion of housing 61 and are used to rotatably mount a hollow shaft 89 which extends transversely to the axis of rotation of grinding wheel 41 and to worm screw 65. A motor 90 is coupled to hollow shaft 89 by means of a speed reduction box 91, sprockets 93 and 94 and chain 95. Motor 90 and speed reduction box 91 are both supported to the inside of housing 61 by means of a bracket or shelf 92. The sense of rotation of hollow shaft 89 is that shown by means of arrow 96 in FIG. 10.

The tire to be ground is supported to hollow shaft 89 by means of a rim structure 97 which comprises spoke elements 98 and 99 and hub member 100. As best shown in FIG. 8, shaft 89 is provided with an annular shoulder portion 101 against which hub 100 bears due to the presence of a nut 102 onto the threaded extremity 103 of hollow shaft 89. Finger 104 secured to the shoulder 101 of hollow shaft 89 comprises an axial extension that projects through an aperture 105 of spoke member 98, thus locking the rim structure 97 against rotation relative to hollow shaft 89.

Within tire P a band of rubber 106 in the form of an annular element provided with an inflation valve 107 permits inflation of the tire once mounted in position on rim structure 97. Flexible tube 112 connects inflation valve 107 to a source of pressurized fluid, normally air, supplied by means of a pipe 113 in communication with the interior of hollow shaft 89 as illustrated in FIGS. 2 and 8.

Rim assembly 97 includes a series of hooks 108 which are adapted to hold in place a ring 109 made up by two complementary parts each describing an arc of 180 degrees. Ring structure 109 laterally retains tire P in place on rim assembly 97. For installation of the two half-moon parts of ring 109, handles 110 are provided at spaced locations as seen in FIG. 1. Slot 111 in rim assembly 97 permits insertion and removal of valve element 107.

With reference to FIG. 2, a scale 114 is mounted to support 4 projecting towards housing 61. An indicator 115 supported to housing 61 permits the measurement of the depth of the grind effected by means of grinding wheel 41. Similarly, a scale 116 supported to structure 4 longitudinally of worm screw 17 and curved plate 9 permits the control of the position of the buffer assembly through the use of an indicator 117 on threaded block 18.

Figure 3:
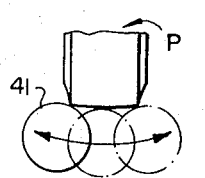
FIGS. 3, 4 and 5 show schematically the buffing of tires along three different profiles.
Figure 4:
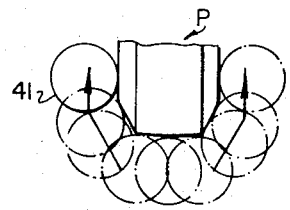
Figure 5:
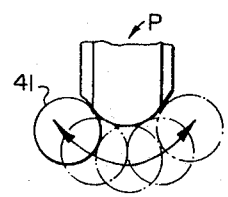

The operator of the buffing apparatus thus far described can control the operation of the apparatus either manually by means of cranks 20 and 66 or alternatively by automatic means operating the electrical motors 25 and 75. The profile of the ground tread portion of tire P can be defined by the radius of curvature of guide plate 9 as shown in FIG. 3 but as shown in FIGS. 4 and 5, the radius of the curve which may be continuous or broken can be controlled by suitably monitoring the relative speeds of rotation of worm screws 17 and 65. For obtaining the exact profile for different kinds of tires, the operator may use reference tables containing the necessary data from which he will be able to make the necessary manual operations, or, alternatively, electrical circuitry may be resorted to for the purpose of programming the relative speeds of the motors as a function of the position of the threaded blocks 64 and 18 along their respective worm screw.

It will be apparent that numerous modifications to the above described preferred embodiment can be made without departing from the scope of the invention as defined in the accompanying claims. For example, details of constructions, the type of clutches, motors, aspirator and the like illustrated could easily be modified within the scope of the invention.

I claim:

1. Apparatus for buffing the tread portion of tires to be retreaded comprising: a frame, buffer guide means secured to said frame and extending essentailly parallel to the axis of rotation of said tire, a carrier movable along said buffer guide means, a buffer assembly mounted to said carrier for moving therewith, a mounting structure adapted to support a tire whose tread is to be ground by said buffer assembly, and positioning means adapted to vary the distance between the axis of rotation of said tire and said buffer guide means along a line extending essentially radially of said tire thereby to determine the depth of the buffing taking place upon rotation of said tire around its axis of rotation and rotation of the grinding wheel of said buffer assembly, said buffer guide means comprising as a principal component a rigid member forming an arcuate surface facing said tire, said arcuate surface being concave and having its imaginary chord extending essentially parallel to the axis of rotation of said tire, said carrier comprising guide rollers bearing against said arcuate surface and causing said buffer assembly to follow said arcuate surface when moved along said buffer guide means transversely of the tread portion of said tire, said buffer assembly further comprising a buffer motor secured to said carrier, an output shaft rotatable by said motor and supporting said grinding wheel, and brake means operable to stop rotation of said output shaft, suction means operatively associated to said grinding wheel and adapted to aspirate the ground particles detached from said tire during buffing of its tread portion by said grinding wheel, said suction means comprising a dust collecting cover partly enclosing said grinding wheel, an aspirator and a vacuum tube coupling said dust collecting cover to said aspirator, and said buffer motor being adapted to selectively rotate said grinding wheel in either direction, and wherein said dust collecting cover includes vane means pivoted within said dust collecting cover and adapted to prevent the escape of dust accepted through said vacuum tube, said vane means being pivotable between two extreme positions, each extreme position corresponding to a sense of rotation of said grinding wheel.

2. Apparatus for buffing the tread portion of tires to be retreaded comprising: a frame, buffer guide means secured to said frame, a carrier movable along said buffer guide means, a buffer assembly mounted to said carrier for moving therewith, a mounting structure for supporting a tire and rotating same, whose tread is to be ground by said buffer assembly and positioning means for varying the distance between the axis of rotation of said tire and said buffer guide means along a line extending essentially radially of said tire thereby to determine the depth of the buffing taking place upon rotation of said tire around its axis of rotation and rotation of the grinding wheel of said buffer assembly, wherein said mounting structure comprises a spindle and a tire supporting rim for mounting to said spindle, said spindle projecting generally transversely relative to the axis of rotation of said grinding wheel and being suitably spaced apart therefrom, said mounting structure including a base and a tower supported to said base and mounting said spindle, and retaining means for supporting said tower onto said base and for guiding said tower when displaced along said base under the action of said positioning means, said positioning means comprising a worm screw and a threaded block rotatably mounted thereto and movable therealong upon rotation of said worm screw, said worm screw and threaded block being operatively associated respectively with said tower and said base whereby upon rotation of said worm screw said tire is caused to move along said base in said line extending essentially radially of said tire, said worm screw being parallel to said line, and drive means for rotating said worm screw, said drive means comprising a motor coupled to said worm screw for rotating said worm screw in either sense of rotation, a pair of limit switches disposed at spaced apart locations along said worm screw with said threaded block therebetween, and actuable when said tower reaches one of two extreme positions, and circuit means for adapted responding to actuation of said limit switches and for stopping rotation of said worm screw, said apparatus further comprising a clutch device mounted between said motor and said worm screw and including a displaceable element and a fork engaging said displaceable element, a solenoid acting upon said fork to pivot same in one direction to cause disengagement of said worm screw relative to said motor, and a crank coupled to said worm screw for manually rotating same, and wherein said tower forms a housing, said retaining means comprising spaced apart parallel constant cross-section bars secured to the under side of said housing, and a plurality of apertured blocks closely fitted around said rods and secured to said base, said limit switches being mounted to some of said blocks for adjustment along the length of said worm screw, a finger secured to said housing and extending towards said switches for actuating same while said housing approaches said extreme positions determined by the position of said limit switches, said threaded block being secured to said base while said worm screw is rotatably mounted to said housing, said crank being mounted for actuation from the outside of said housing and being coupled to said worm screw interiorly of said housing, said apparatus additionally comprising a tire drive motor coupled to said spindle and adapted to rotate same and the tire mounted thereon by means of said rim for buffing.

3. Apparatus as defined in claim 2 additionally comprising a first position indicator associated to said housing for providing a first reference representative of the position of said housing relative to said base, and a second position indicator related to said carrier for providing a reference indication of the position of said carrier along the length of said buffer guide means.

* * * * *